United States Patent [19]
MacIntyre

[11] Patent Number: 5,283,550
[45] Date of Patent: Feb. 1, 1994

[54] SHOPPING CART RECEIVER ALARM SYSTEM

[75] Inventor: Daniel C. MacIntyre, Beaverton, Oreg.

[73] Assignee: Wild's - Wild Things, Inc., Scappoose, Oreg.

[21] Appl. No.: 893,494

[22] Filed: Jun. 4, 1992

[51] Int. Cl.$^5$ .................. G08B 1/08; G08B 13/14
[52] U.S. Cl. .................. 340/539; 340/309.15; 340/568; 340/571; 455/229; 194/905
[58] Field of Search ........... 340/539, 531, 571, 572, 340/568, 309.15; 455/9, 67.1, 67.7, 134, 226.2, 229; 194/905

[56] References Cited

U.S. PATENT DOCUMENTS

| | | | |
|---|---|---|---|
| 3,157,871 | 11/1964 | Umanoff | 340/280 |
| 3,317,841 | 5/1967 | Umanoff | 325/364 |
| 4,242,668 | 12/1980 | Herzog | 340/539 |
| 4,352,097 | 9/1982 | Hamann | 340/571 |
| 4,591,175 | 5/1986 | Upton et al. | 280/33.99 |
| 4,593,273 | 6/1986 | Narcisse | 340/539 |
| 4,772,880 | 9/1988 | Goldstein et al. | 340/571 |
| 4,851,815 | 7/1989 | Enkelmann | 340/571 |
| 4,853,692 | 8/1989 | Wolk et al. | 340/573 |
| 4,868,544 | 9/1989 | Havens | 340/572 |

Primary Examiner—Donnie L. Crosland
Attorney, Agent, or Firm—Marger, Johnson, McCollom & Stolowitz

[57] ABSTRACT

A shopping cart receiver alarm system includes an RF transmitter for transmitting an RF signal having at least a minimum signal strength within a boundary that is generally defined by the outermost contours of a store parking lot. A receiver assembly responsive to the RF signal is housed within the handle of a shopping cart. The receiver assembly includes a self-contained power supply, an RF receiver for receiving the RF signal and for providing an output signal indicating a loss of RF signal strength. The receiver assembly further includes a timing circuit and an audible alarm responsive to an alarm signal generated by the timing circuit. The alarm signal controls the audible alarm according to a selectable alarm timing sequence that is initiated by the output signal of the RF receiver. According to the alarm timing sequence, the timing circuit activates the audible alarm for a first period of time, inactivates the audible alarm for a selectable grace period of time to encourage return of the shopping cart, and, if the shopping cart is not returned, the audible alarm is thereafter continuously activated. The audible alarm is immediately inactivated at any time during the alarm timing sequence if the shopping cart is returned within the boundary.

25 Claims, 7 Drawing Sheets

SHOPPING CART RECEIVER ALARM SYSTEM

BACKGROUND OF THE INVENTION

This invention relates to shopping carts and more specifically to an alarm and alarm system designed to deter theft of shopping carts.

Grocery stores, shopping malls and plazas, garden and hardware centers and the like conventionally employ numerous shopping carts to facilitate handling and transportation of goods by customers to and from check-out points and to parked vehicles. Such carts are usually fairly expensive since they are very durably made of relatively expensive materials, such as stainless steel or chrome steel, to withstand constant strenuous use by customers. Because of the large number of such carts that may be typically employed by a single grocery store, and the large volume of business that may be conducted during business hours in that area, it is usually relatively simple to remove a shopping cart from the premises without the removal being detected by store personnel. Such large numbers of shopping carts are stolen each year that shopping cart thefts represent a significant part of the overhead of a number of businesses.

Systems proposed in the past for reducing the numbers of stolen shopping carts include anti-theft devices, recovery systems, and deterrent systems.

Anti-theft devices typically are used to physically immobilize the shopping cart or prevent it from being pushed in a straight line once the shopping cart is removed beyond a predetermined boundary. Such anti-theft systems are taught in the following U.S. Patents: U.S. Pat. No. 4,772,880 to Goldstein et al; U.S. Pat. No. 4,591,175 to Upton et al; and U.S. Pat. No. 4,242,668 to Herzog. One problem with such the systems is that, while they may indeed prevent theft of the shopping cart, injuries may potentially result when the shopping cart suddenly stops, thus exposing the grocery store owner to liability.

Recovery systems do not actually prevent theft of the shopping carts but are used to try and recover the carts that are taken beyond the boundary of the store parking lot and abandoned. Typically, a transmitter in the shopping cart is used to transmit a high frequency that is not audible but detectable only with appropriate receiver equipment. A shopping cart retrieval crew in a vehicle containing the receiver is needed to track down the abandoned shopping cart. Such a recovery system having a VHF beacon transmitter housed in the handle of a shopping cart is shown in U.S. Pat. No. 4,868,544 to Havens.

Deterrent systems typically include an alarm in the shopping cart that sounds when the shopping cart is removed beyond a predetermined boundary. Such a deterrent alarm is taught in U.S. Pat. No. 3,157,871 to Umanoff. This alarm system includes a receiver and alarm included in the shopping cart basket itself, decreasing the effective capacity of the shopping cart.

Therefore, a need still exists for a small, safe, and effective system for reducing the numbers of stolen shopping carts.

SUMMARY OF THE INVENTION

In accordance with the present invention, a shopping cart receiver alarm system includes an RF transmitter for transmitting an RF signal having at least a minimum signal strength within a boundary that is generally defined by the outermost contours of a store parking lot. A receiver assembly responsive to the RF signal is housed within the handle of a shopping cart. The receiver assembly includes a self-contained power supply, an RF receiver for receiving the RF signal and for providing an output signal indicating a loss of RF signal strength. The receiver assembly further includes a timing circuit and an audible alarm responsive to an alarm signal generated by the timing circuit. The alarm signal controls the audible alarm according to an alarm timing sequence that is initiated by the output signal of the RF receiver. According to the alarm timing sequence, the timing circuit activates the audible alarm for a first period of time, inactivates the audible alarm for a selectable grace period of time to encourage return of the shopping cart, and, if the shopping cart is not returned, the audible alarm is thereafter continuously activated. The audible alarm is immediately turned off at any time during the alarm timing sequence if the shopping cart is returned within the boundary defined by the RF transmitter.

It is an object of the present invention to provide effective deterrence to theft of shopping carts from a grocery store, shopping mall, garden and hardware centers or the like to reduce overhead.

It is another object of the present invention to provide a deterrent alarm that sounds whenever the shopping cart is removed beyond a defined boundary.

It is another object of the present invention to provide a deterrent alarm containing a selectable grace period to encourage return of the shopping cart.

It is a further object of the present invention to provide a receiver alarm capable of being retrofitted to and housed within existing shopping cart handles.

It is a further object of the present invention to provide a receiver alarm that is weather and element proof and can withstand constant strenuous use by customers.

DETAILED DESCRIPTION OF THE INVENTION

Figure 1:
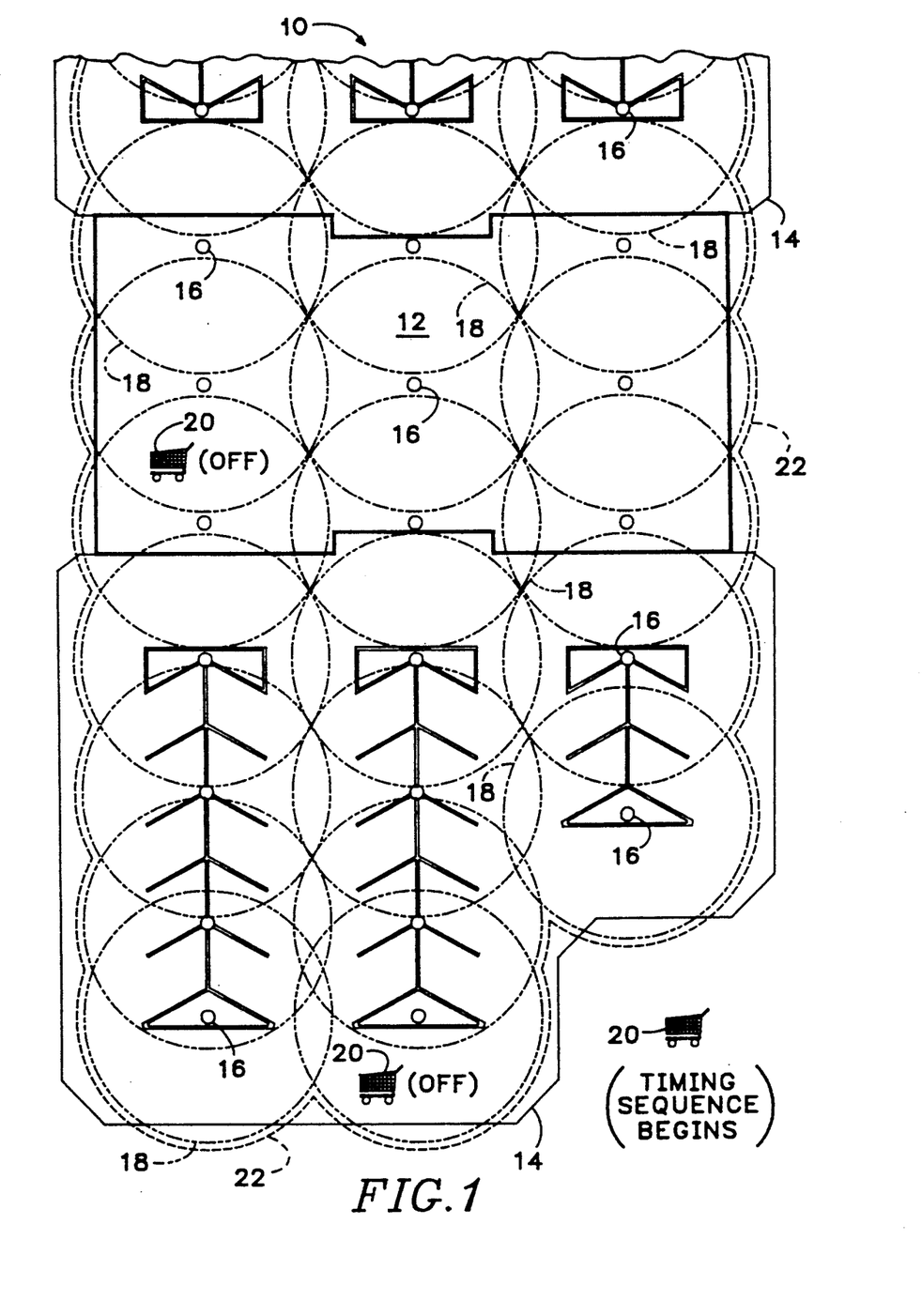
FIG. 1 illustrates a typical store and parking lot environment wherein an outer allowable boundary is formed by a plurality of transmitters.
Figure 2:
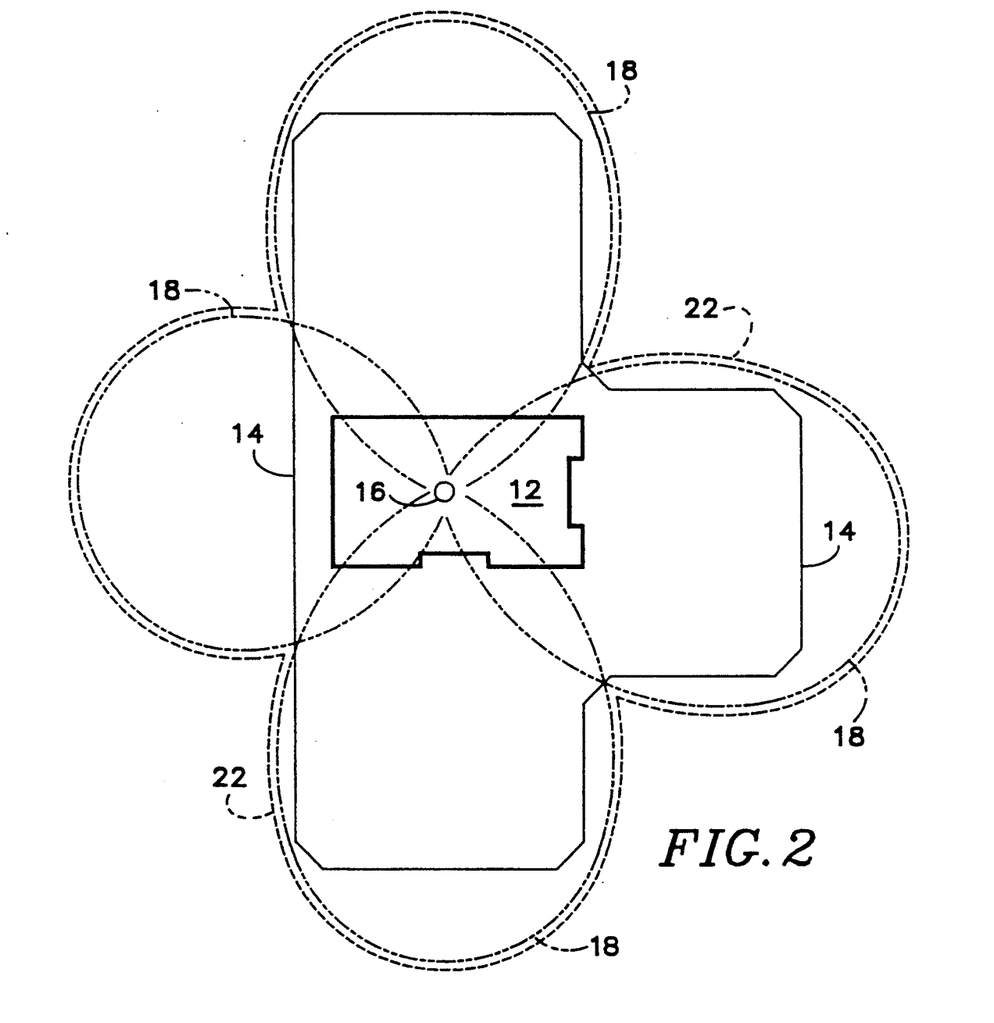
FIG. 2 illustrates an outer allowable boundary formed by a single transmitter.

A typical environment for using the shopping cart receiver alarm system 10 of the present invention is illustrated in FIG. 1. A grocery store 12 or the like includes an adjacent parking lot 14. In general, it would be desirable to keep all of the grocery store's shopping carts within a boundary defined by the property line of the store and parking lot. Therefore, a plurality of RF signal transmitters 16 having an effective range 18 are ideally mounted atop parking lot light standards located to provide a minimum RF signal strength within this boundary. In addition, by using a plurality of transmitters 16, the effective cumulative range 22 can be tailored to closely approximate the outer boundary of the store 12 and parking lot 14. In FIG. 2, a single transmitter 16 having a multiple pole antenna is shown providing a minimum RF signal strength within the boundary defined by the store 12 and parking lot 14. Although the effective range 22 of a single transmitter 16 can be used to provide the necessary minimum RF signal within the boundary, the effective range 22 is not as closely tailored to the contours of the boundary.

Thus, in FIGS. 1 and 2, the shopping cart receiver alarm system 10 of the present invention includes at least one transmitter 16 for transmitting an RF signal, a shopping cart 20 having a handle, and an RF receiver assembly housed within the handle of the shopping cart (the receiver assembly is not shown in FIGS. 1-2 but is best seen in FIGS. 6-9). The receiver assembly includes a power supply, an RF receiver, an audible alarm, and a timing circuit. During normal use, the alarm is inactive if the shopping cart 20 is within the effective range 22 of the transmitter. However, if the shopping cart 20 is removed beyond the effective range 22 of the transmitter 16, the timing circuit is activated and a corresponding alarm signal activates the audible alarm according to a selectable alarm timing sequence. The alarm is immediately inactivated if the shopping cart 20 is returned within the effective range 22 of the transmitter 16. The apparatus and operation of the receiver assembly is further described and illustrated in greater detail below.

Figures 3, 4, 5:
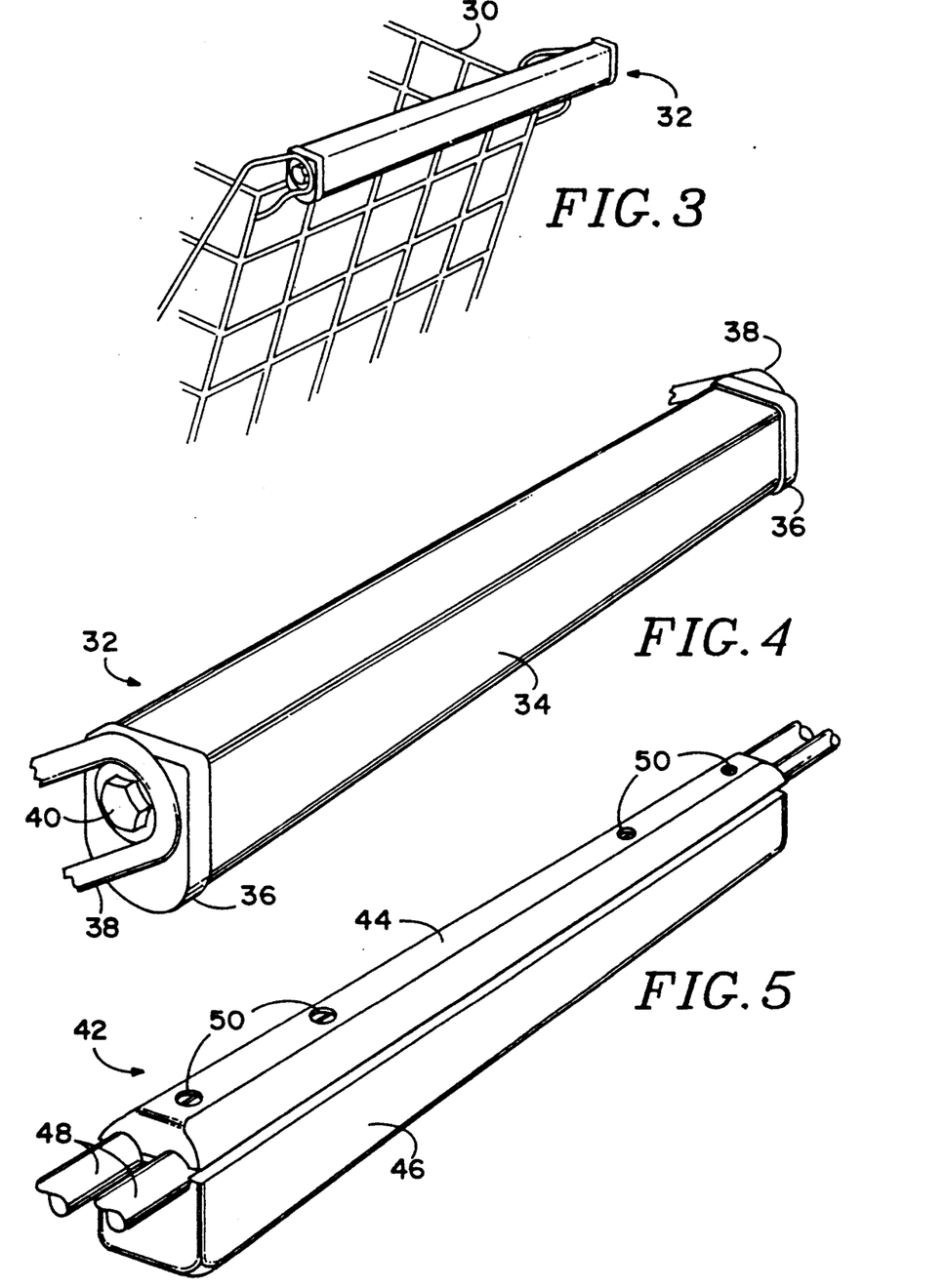
FIG. 3 is a perspective view illustrating a shopping cart having a first type of handle that can be retrofitted to accept the receiver assembly of the present invention.
FIG. 4 is an enlarged view of a first type of shopping cart handle.
FIG. 5 is an enlarged view of a second type of shopping cart handle.

A first type of handle 32 that can be retrofitted to accept the receiver assembly of the present invention is shown attached to a shopping cart 30 in FIG. 3. FIG. 4 is an enlarged view of the shopping cart handle 32 including a hollow, tubular housing 34 for receiving and containing the entire receiver assembly. First and second end portions 36 enclose the tubular housing and attachment means 38 secures the enclosed tubular housing to the shopping cart. The attachment means 38 is usually an integrally formed portion of the shopping cart fastened to the end portions 36 with a bolt and washer 40.

Figures 6, 7, 9:
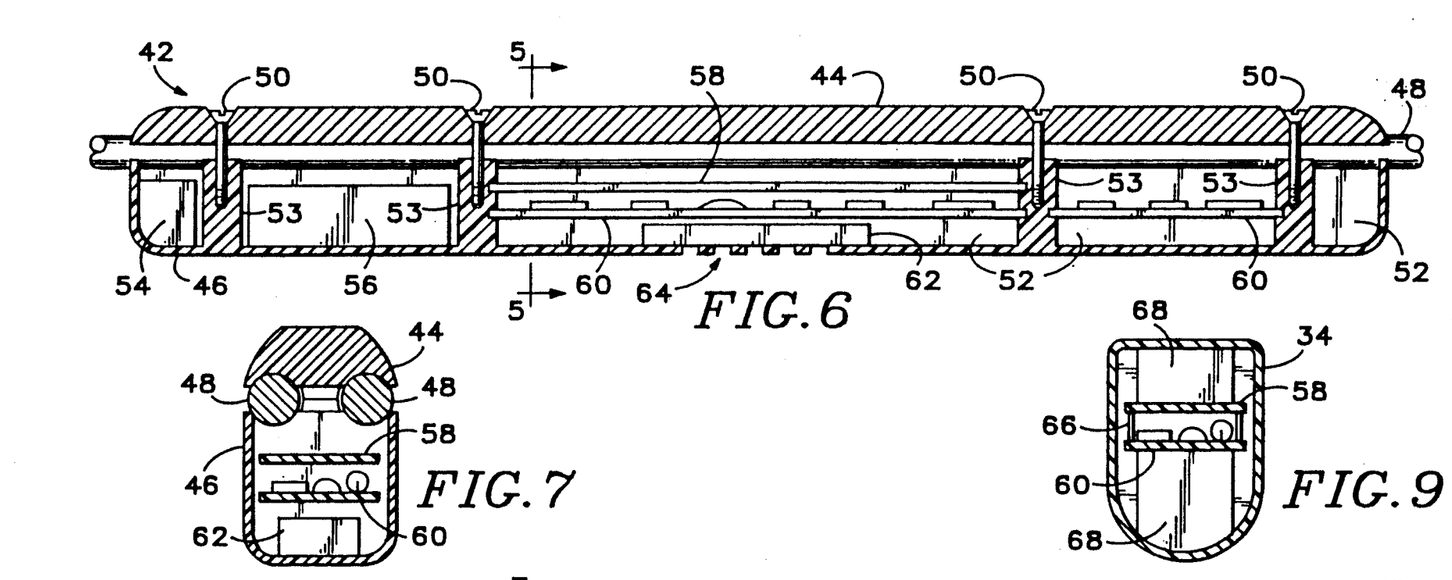
FIG. 6 is a lengthwise cross-sectional view of the first type of shopping cart handle retrofitted to house the receiver assembly of the present invention.
FIG. 7 is a cross-sectional view along lines 7—7 of FIG. 6.
FIG. 9 is a cross-sectional view along lines 9—9 of FIG. 8.

The entire receiver assembly is housed within the hollow tubular housing 34 as shown in the lengthwise cross-sectional view of the handle 32 in FIG. 6. The receiver assembly includes a pickup coil 54, a battery 56, an antenna circuit board 58, and other circuit boards 60. An audible alarm 62 is ideally mounted over a sound port 64 and environmentally sealed with a weatherproof cover located inside the handle. The antenna circuit board 58 and other circuit boards 60 are set apart from each other using standoffs 66. The entire receiver assembly is made to fit into the circumference of the tubular housing 34 with plastic spacers 68. Circuit boards 58 and 60 can be suitably attached to each other and to the tubular housing 34 by other means if desired.

A cross-sectional view of handle 32 along lines 7—7 of FIG. 6 is shown in FIG. 7. The tubular housing 34 is shown housing the antenna board 58 and circuit board 60 set apart with standoffs 66. The attached circuit boards 58 and 60 are shown attached to the tubular housing 34 with spacers 68.

A second type of shopping cart handle 42 that can be retrofitted to accept the receiver assembly of the present invention is shown in FIG. 5. Shopping cart handle 42 includes a pair of metal rods 48 integrally formed with the shopping cart 30. An upper handle portion 44 has an indentation for mating with an upper surface of the pair of metal rods 48 and a lower handle portion 46 has an indentation for mating with a lower surface of the pair of metal rods 48. The lower handle portion 46 cannot be used since it is typically a solid piece of plastic. A new lower handle portion 46 having at least one cavity for housing the receiver assembly is ideally fabricated by a molding process.

Figure 8:
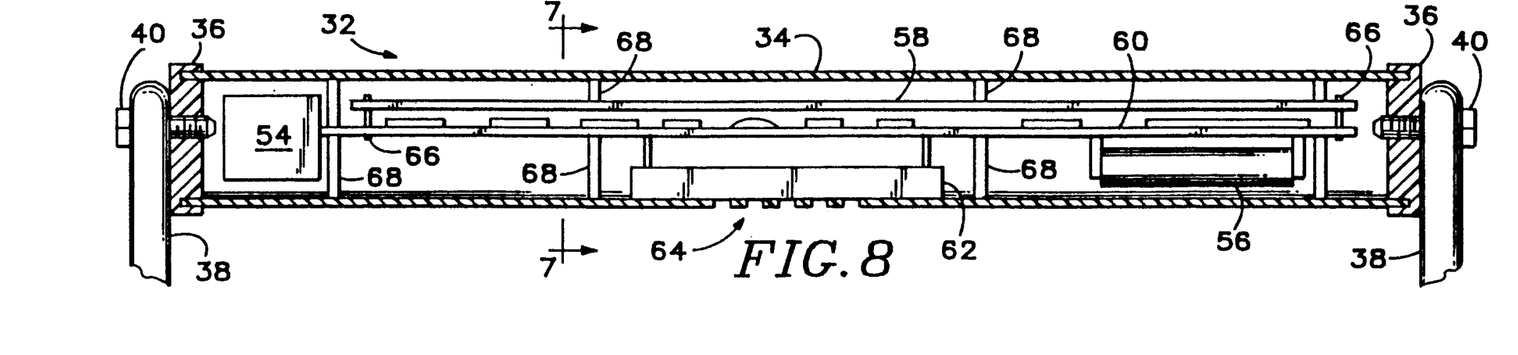
FIG. 8 is a lengthwise cross-sectional view of the second type of shopping cart handle retrofitted to house the receiver assembly of the present invention.

A molded lower handle portion 46 containing cavities 52 for housing the receiver assembly is shown in FIGS. 8-9. A means for fastening the upper handle portion 44 to the lower handle portion 46 and to the metal rods typically includes a plurality of screws 50. The screws 50 are screwed into countersunk holes, pass through the gap between the pair of metal rods 48 and contact molded projections 53 in the lower handle portion 46.

The entire receiver assembly is housed within the lower handle portion 46 as shown in the lengthwise cross-sectional view of the handle 42 in FIG. 8. Generally, from left to right, the receiver assembly includes a pickup coil 54 used in the recharging of the battery in a self-contained power supply. A battery 56 such as a NiCad cell provides power for the receiver assembly when the receiver alarm is in normal use. An antenna for receiving the RF signal is etched onto a foil layer of an antenna circuit board 58. Other circuit boards 60 contain other electronic circuitry for the receiver, power supply, and timing circuits. An audible alarm 62 is ideally mounted over a sound port 64 and environmentally sealed with a weatherproof cover located inside the handle. Such a weatherproof cover can be made of a thin layer of flexible plastic or other material such as MYLAR ® plastic film. The antenna circuit board 58 and other circuit boards 60 are placed into cavities in the molded projections 53. Circuit boards 58 and 60 can be suitably attached to the lower handle portion 46 by other means if desired.

A cross-sectional view of handle 42 along lines 9—9 of FIG. 8 is shown in FIG. 9. Thus, upper and lower handle portions 44 and 46 are shown enclosing the pair of metal rods 48. The entire molded lower handle portion 46 is shown housing the antenna board 58, circuit boards 60, and the audible alarm 62.

in both of the handles 32 and 42 shown in FIGS. 6-9, the cavities are not totally filled by the receiver assembly and mounting hardware. Thus the remaining cavity space can be filled with a potting compound such as black resin to form a weather and environment proof receiver assembly. If desired, handles 32 and 42 can be fitted with a visible warning label that identifies the shopping cart 30 as containing an audible alarm 62 that will sound if the shopping cart 30 is removed off the store premises.

Figure 10:
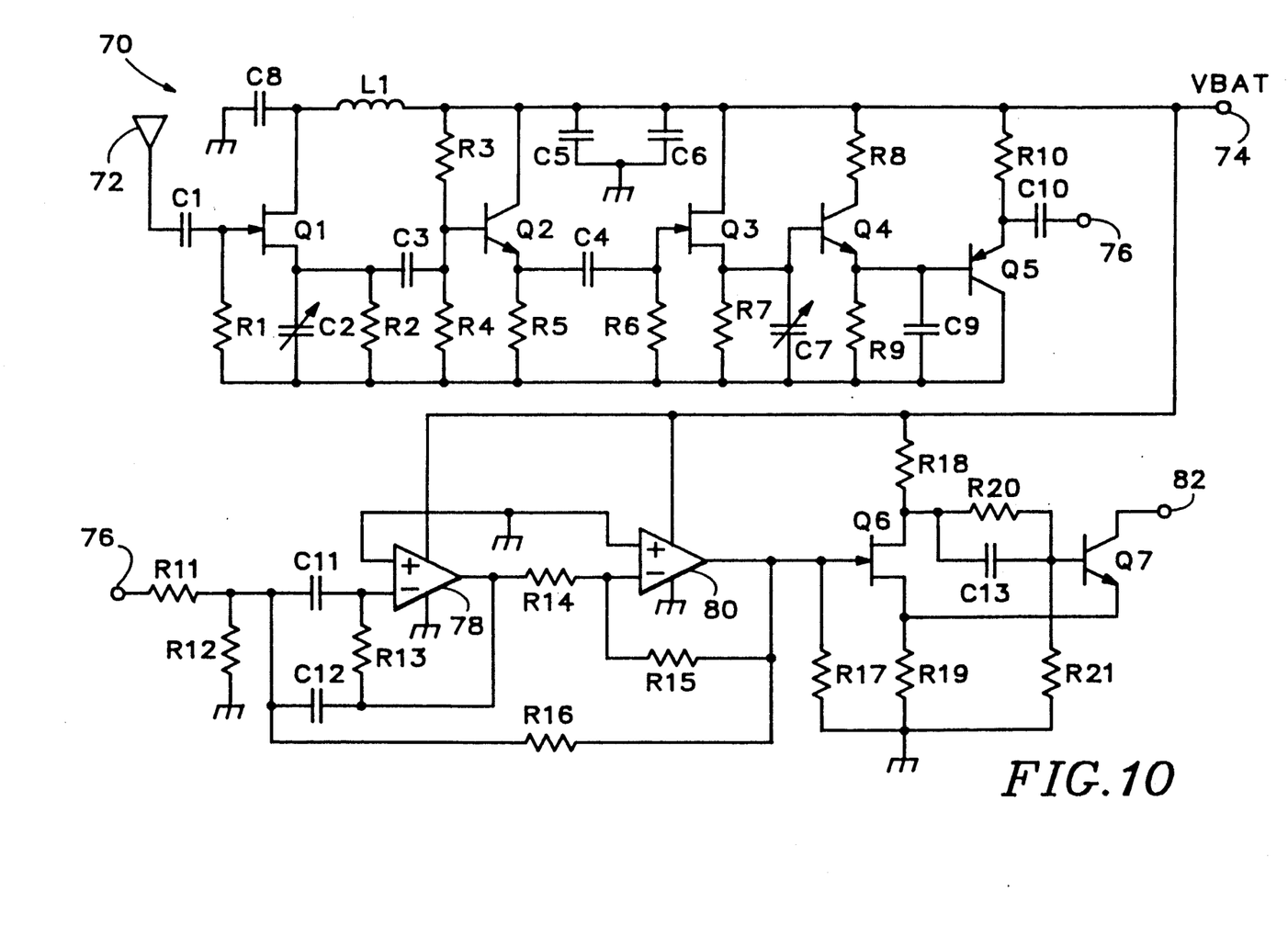
FIG. 10 is a schematic diagram of an RF receiver.

A first portion of the circuitry of the receiver assembly includes a receiver 70 shown in the schematic diagram of FIG. 10. The receiver 70 includes a demodulator, an amplifier, a filter, and a Schmitt trigger. The receiver 70 has an input for receiving an RF signal through antenna 72 and an output for providing an output signal indicating a loss of RF signal strength at circuit node 82. The demodulator includes field-effect transistor ("FETS") Q1 and a bipolar-junction transistors ("BJT") Q2 along with resistors R1-R5, capacitors C1-C3, and inductor L1. The demodulator is configured to remove RF carrier signal and provide a demodulated 2 KHz tone at the emitter of BJT Q2 with a single inductor, L1. An amplifier includes FET Q3 and BJTs Q4-Q5 along with resistors R6-R10 and capacitors C7-C10 for providing an amplified, demodulated 2 KHz tone at circuit node 76. Capacitors C5-C6 are used to decouple the five volt supply voltage VBAT, coupled to the receiver 70 at node 74. Capacitors C2 and C7 are shown as variable capacitors that can be used to adjusted the amplifier gain, but can be fixed capacitors once the operating conditions for the receiver 70 are known. Operational amplifiers 78 and 80, resistors R11-R15, and capacitors C11-C12 form an active bandpass filter section having a narrow bandpass for further removing any RF carrier signal. A Schmitt trigger includes FET Q6 and BJT Q7, resistors R17-R21 and capacitor C13 for providing an indication of loss of RF signal strength at circuit node 82. The Schmitt trigger is used to provide a sharp indication of loss of RF signal as the shopping cart is removed passed the designated boundary and the RF signal strength slowly diminishes. Thus, the output signal of the Schmitt trigger is essentially a voltage step that is triggered by the loss of RF signal below a minimum amount that can be set by adjusting the Schmitt trigger threshold.

Figures 11, 13:
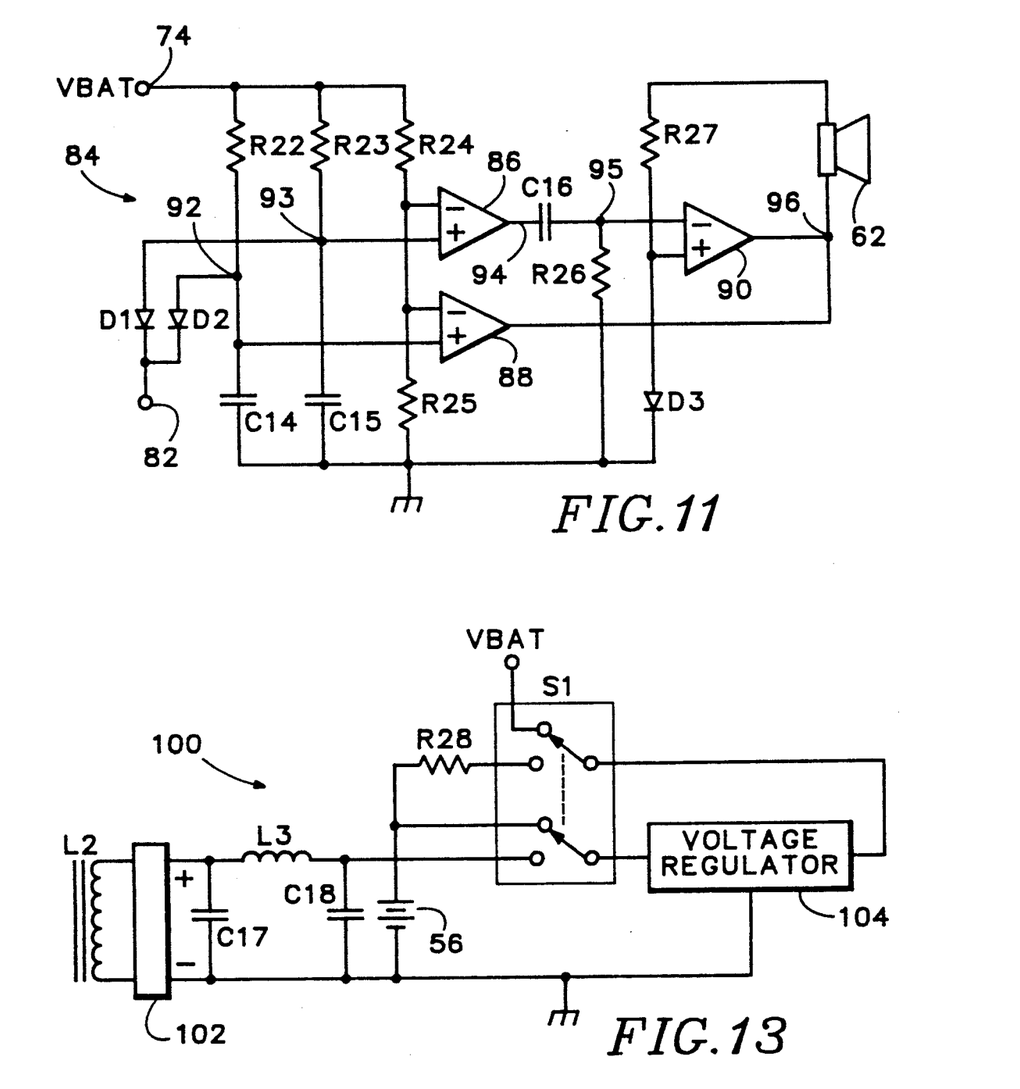
FIG. 11 is a schematic diagram of a timing circuit.
FIG. 13 is a schematic diagram of a power supply.

Referring to FIG. 11, a timing circuit 84 responsive to the output signal at circuit node 82 provides an alarm signal at circuit node 96 for activating an audible alarm 62. When the alarm signal is low, or near ground, the alarm is activated, and when the alarm signal is high, or near VBAT, the alarm is inactivated. The alarm signal has sequential low and high states according to a selectable alarm timing sequence. Timing circuit 84 includes three comparators 86, 88, and 90, resistors R22-R27, capacitors C14-C16, and diodes D1 and D2. Resistor R22 and capacitor C14, as well as resistor R23 and capacitor C15 form two timing legs having two different time constants. Capacitor C16 and resistor R26 forms a differentiating circuit for the output of comparator 86.

Figure 12:
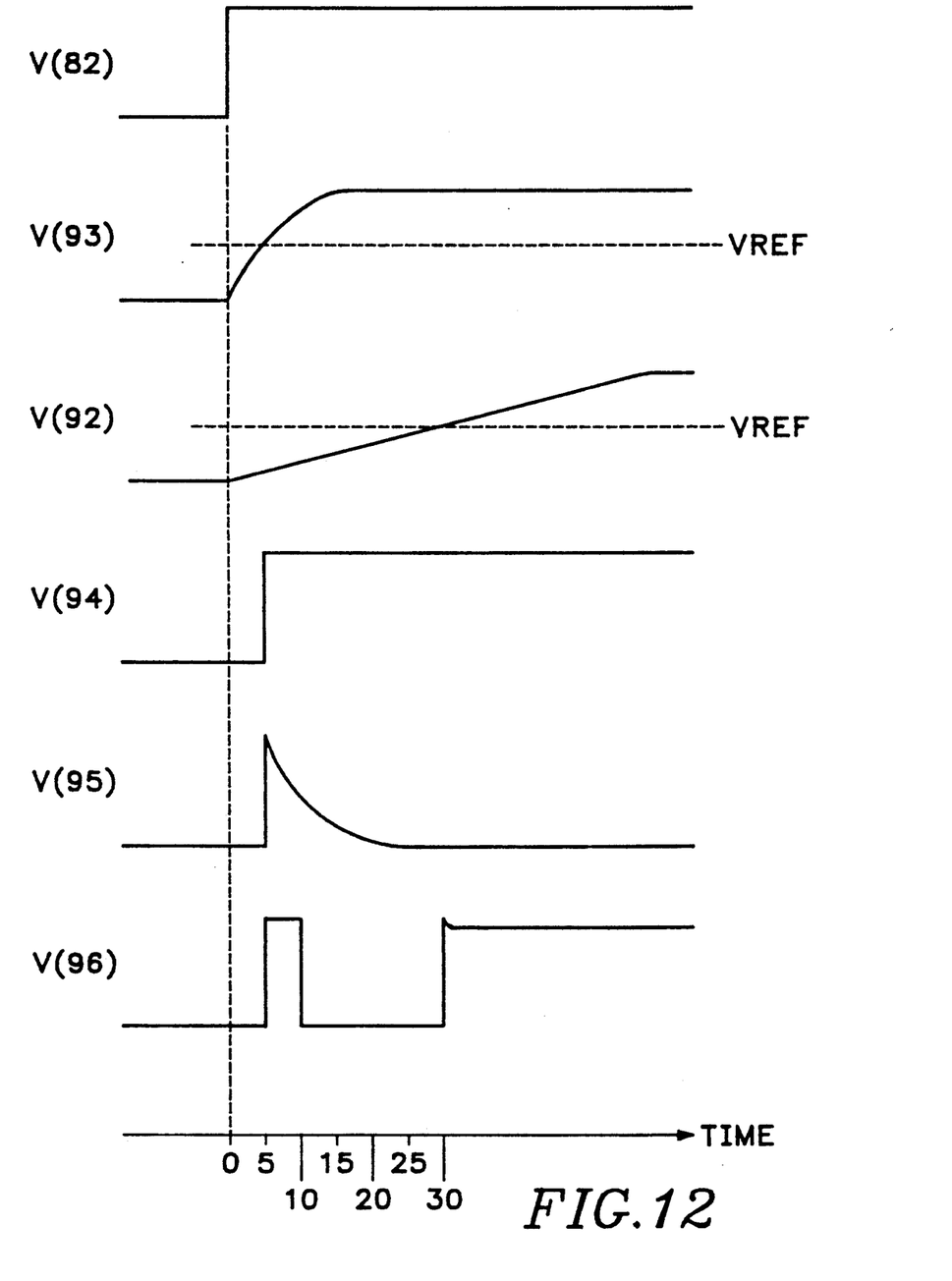
FIG. 12 illustrates an alarm timing sequence produced by the timing circuit for controlling an audible alarm.

For a greater understanding of the timing sequence provided by timing circuit 84, voltage waveforms at several circuit nodes are shown in FIG. 12. The voltage waveforms shown accurately portray the relative timing of the waveforms, but do not necessarily accurately portray the correct magnitude or polarity of the waveform. Thus V(82) is a step function provided by the Schmitt trigger circuit that initiates the timing sequence. The voltage V(93) at circuit node 93 reaches a final value on the order of five seconds, whereas the voltage V(92) at circuit node 92 reaches a final value on the order of 35 seconds. The output of comparator 86, V(94) is thus a delayed voltage step. This voltage step is differentiated by capacitor C16 and resistor R26, producing a voltage spike at V(95) at circuit node 95. This voltage spike is converted into a delayed five second pulse at the output of comparator 90. Thus, five seconds after the timing sequence is initiated, the audible alarm is activated for five seconds. About twenty seconds later, V(92) trips comparator 88 and the audible alarm is continuously activated.

The step function V(82) immediately returns low if the RF signal strength is restored by returning the shopping cart within the boundary defined by the RF transmitter. Correspondingly, the audible alarm is inactivated at any time during the timing sequence if the RF signal is restored above a predetermined level.

Thus, the timing sequence provides a ground potential voltage at circuit node 96 that activates the audible alarm 62 for a first predetermined period of time equal to about five seconds after an initial delay of about five seconds. The audible alarm 62 is then inactivated for a selectable grace period of time of about 35 seconds to encourage the return of the shopping cart, and thereafter the audible alarm is continuously activated.

The self-contained power supply circuit 100 shown in FIG. 13 includes a power supply terminal designated VBAT for distributing power to the receiver, the timing circuit, and the audible alarm. In the normal operating condition, power is supplied by a battery 56 such as a five volt NiCAD cell. A voltage regulator 104 couples the battery voltage to the power supply terminal VBAT. For recharging the battery when the receiver alarm is not in use, the power supply circuit further includes an induction coil L2 and a rectifier 102 coupled to the induction coil L2. Energy to the induction coil L2 can be provided by an external coil (not shown) located proximate to the induction coil L2. A switch S1 couples the battery 56 and voltage regulator 104 to the power supply terminal in the normal operational mode. Switch S1 couples the rectifier 102 output to the battery 56 while decoupling the battery 56 from the power supply terminal VBAT in a recharging mode. Switch S1 is ideally a reed switch that is activated by an external magnetic clip (not shown), the magnetic clip being placed around the shopping cart handle in a location proximate to the reed switch. During the recharging process, an external magnetic coil (not shown) activates reed switch S1.

It is understood by those skilled in the art that the shopping cart receiver alarm and alarm system can be made in various suitable forms in addition to those previously described. For example, the exact circuitry used in the receiver can be modified as desired for other transmitters or types of broadcast signals, modulated or unmodulated. The exact circuitry used in the timing circuit can easily by modified or new circuitry substituted to provide the same or other alarm timing sequences. Further, the receiver assembly is not limited to the shape and size of the shopping cart handles described herein, but can modified to fit any other existing handle, or to retrofit and existing handle with cavities suitable to contain the receiver assembly.

Various other modifications and additions can be made in the shopping cart receiver alarm and alarm system without departing from the scope of the present invention. Therefore, the invention is not limited to the disclosed embodiment but only by the appended claims.

I claim:

1. A shopping cart receiver alarm system comprising:
   (a) a transmitter for transmitting an RF signal;
   (b) a shopping cart having a handle; and
   (c) a receiver assembly housed within the handle of the shopping cart, the receiver assembly comprising:

(i) a power supply for distributing power to the receiver assembly;
(ii) an RF receiver having an input for receiving the RF signal and an output for providing an output signal indicating a loss of RF signal strength;
(iii) timing means responsive to the output signal for providing an alarm signal, the alarm signal having sequential first and second states according to a predetermined timing sequence; and
(iv) an audible alarm responsive to a first state of the alarm signal and unresponsive to a second state of the alarm signal.

2. A shopping cart receiver alarm system as in claim 1 including means for immediately inactivating the audible alarm at any time during the timing sequence if the RF signal is restored above a predetermined level.

3. A shopping cart receiver alarm system as in claim 1 in which the timing means includes means for activating the audible alarm for a first predetermined period of time, inactivating the audible alarm for a predetermined grace period of time, and thereafter continuously activating the audible alarm.

4. A shopping cart receiver alarm system as in claim 3 in which the first period of time is about five seconds, and the grace period of time is about thirty seconds.

5. A shopping cart receiver alarm system as in claim 3 in which the timing means includes means for inactivating the audible alarm for a delay period of time preceding the first predetermined period of time.

6. A shopping cart receiver alarm system as in claim 1 including a plurality of transmitters placed at predetermined locations to a define a minimum signal strength boundary, wherein the RF signal strength is greater than a predetermined minimum strength within the boundary.

7. A shopping cart receiver alarm system as in claim 1 in which the handle comprises:
(a) a hollow, tubular housing for receiving and containing the receiver assembly;
(b) first and second end portions enclosing the tubular housing; and
(c) attachment means for securing the enclosed tubular housing to the shopping cart.

8. A shopping cart receiver alarm system as in claim 1 in which the handle comprises:
(a) a metal rod integrally formed with the shopping cart;
(b) an upper handle portion having an indentation for mating with an upper surface of the metal rod;
(c) a lower handle portion having an indentation for mating with a lower surface of the metal rod, the lower handle portion having at least one cavity for housing the receiver assembly; and
(d) means for fastening the upper handle portion to the lower handle portion and to the metal rods.

9. A shopping cart receiver alarm system as in claim 1 in which the handle includes visible identification means for identifying the shopping cart as containing an alarm that will sound if the shopping cart is removed beyond a predetermined boundary.

10. A shopping cart receiver alarm comprising:
(a) a shopping cart handle portion arranged for attachment to a shopping cart; and
(b) a receiver assembly housed within the shopping cart handle portion, the receiver assembly comprising:
(i) a power supply for distributing power to the receiver assembly;
(ii) an RF receiver having an input for receiving an RF signal and an output for providing an output signal indicating a loss of RF signal strength;
(iii) timing means responsive to the output signal for providing an alarm signal, the alarm signal having sequential first and second states according to a predetermined timing sequence; and
(iv) an audible alarm responsive to a first state of the alarm signal and unresponsive to a second state of the alarm signal.

11. A shopping cart receiver alarm system as in claim 10 including means for immediately inactivating the audible alarm at any time during the timing sequence if the RF signal is restored above a predetermined level.

12. A shopping cart receiver alarm system as in claim 10 in which the timing means includes means for activating the audible alarm for a first predetermined period of time, inactivating the audible alarm for a predetermined grace period of time, and thereafter continuously activating the audible alarm.

13. A shopping cart receiver alarm as in claim 10 in which the shopping cart handle portion comprises a hollow, tubular housing for housing the receiver assembly.

14. A shopping cart receiver alarm as in claim 10 in which the shopping cart handle portion comprises a lower handle portion having an indentation for mating with an upper handle portion and a lower surface of a metal rod integrally formed with the shopping cart, the lower handle portion having at least one cavity for housing the receiver assembly.

15. A shopping cart receiver alarm as in claim 10 in which the handle includes a sound port located proximate to the audible alarm.

16. A shopping cart receiver alarm as in claim 15 in which the sound port includes a weatherproof cover located inside the handle.

17. A shopping cart receiver alarm as in claim 10 in which the handle portion and housed receiver assembly define a cavity that is filled with a resin potting compound.

18. A shopping cart receiver alarm as in claim 10 in which the RF receiver comprises:
(a) an antenna for receiving the RF signal;
(b) a demodulator having an input coupled to the antenna and an output for providing a demodulated signal;
(c) an amplifier having an input coupled to the output of the demodulator and an output; and
(d) a Schmitt trigger having an input coupled to the output of the amplifier and an output for providing an indication of loss of RF signal strength.

19. A shopping cart receiver alarm as in claim 18 in which the RF receiver includes a bandpass filter for filtering the demodulated signal.

20. A shopping cart receiver alarm as in claim 18 in which the antenna comprises an etched metal foil layer on a printed circuit board.

21. A shopping cart receiver alarm as in claim 10 in which the power supply circuit comprises:
(a) a power supply terminal for distributing power to the receiver, the timing means, and the audible alarm;
(b) a battery;

(c) a voltage regulator having an unregulated input coupled to the battery and a regulated output coupled to the power supply terminal.

22. A shopping cart receiver alarm as in claim 21 in which the power supply circuit further includes:
   (a) an induction coil;
   (b) a rectifier having an input coupled to the induction coil and an output;
   (c) a switch for alternatively coupling the battery and voltage regulator to the power supply terminal in an operational mode, and for coupling the rectifier output to the battery and decoupling the battery from the power supply terminal in a recharging mode.

23. A shopping cart receiver alarm as in claim 22 in which the switch is a reed switch that is activated by an external magnetic clip, the magnetic clip being placed around the shopping cart handle in a location proximate to the reed switch.

24. A method of preventing theft of a shopping cart, the method comprising the steps of:
   (a) providing a shopping cart having a receiver alarm responsive to an RF signal;
   (b) broadcasting an RF signal, wherein the strength of the RF signal is greater than a minimum signal strength within a predetermined boundary;
   (c) activating the alarm for a first period of time if the shopping cart is removed beyond the predetermined boundary;
   (d) inactivating the alarm for a second grace period of time to encourage the return of the shopping cart; and
   (e) thereafter continuously activating the alarm if not returned to the predetermined boundary within the grace period.

25. A method of preventing theft of a shopping cart as in claim 24, including the step of immediately inactivating the alarm if the shopping cart is returned within the predetermined boundary.

* * * * *